US006470561B1

(12) United States Patent
Misera et al.

(10) Patent No.: US 6,470,561 B1
(45) **Date of Patent: *Oct. 29, 2002**

(54) SPACER AND SPACER FRAME FOR AN INSULATING GLAZING UNIT AND METHOD OF MAKING SAME

(75) Inventors: Stephen C. Misera, Tarentum; Thomas P. Kerr, Pittsburgh; William R. Siskos, Delmont, all of PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/396,263

(22) Filed: Sep. 15, 1999

Related U.S. Application Data

(62) Division of application No. 08/871,826, filed on Jun. 9, 1997, now abandoned, which is a division of application No. 08/451,097, filed on May 25, 1995, now Pat. No. 5,761,946, which is a division of application No. 08/254,222, filed on Jun. 6, 1994, now Pat. No. 5,501,013, which is a division of application No. 08/064,264, filed on May 20, 1993, now Pat. No. 5,351,451, which is a division of application No. 07/906,645, filed on Jun. 30, 1992, now Pat. No. 5,255,481, which is a division of application No. 07/578,697, filed on Sep. 4, 1990, now Pat. No. 5,177,916.

(51) Int. Cl.$^7$ .................................................. B23P 17/00

(52) U.S. Cl. .................... 29/527.1; 29/469.5; 29/527.4; 29/897.312; 52/172

(58) Field of Search ............................ 29/527.1, 527.4, 29/897.3, 897.31, 897.312, 469.5, 509, 514; 52/171, 172, 232, 398, 399, 400, 658, 790; 428/121, 122, 550, 551, 613

(56) References Cited

U.S. PATENT DOCUMENTS

| | | | |
|---|---|---|---|
| 1,736,331 A | 11/1929 | Townsend | |
| 1,836,354 A | 12/1931 | Abrams | |
| 2,086,225 A | 7/1937 | Hiering | |
| 2,097,927 A | 11/1937 | Klemp | |
| 2,149,882 A | 3/1939 | Clements | |
| 2,219,595 A | 10/1940 | Lang | |
| 2,708,774 A | 5/1955 | Seelen | |
| 2,831,244 A | 4/1958 | Adell | |
| 2,885,746 A | 5/1959 | Gura | 20/56.5 |
| 2,974,377 A | 3/1961 | Kunkle | |
| 2,977,722 A | 4/1961 | Mazzoni | 49/82 |
| 3,105,274 A | 10/1963 | Armstrong | |
| 3,280,523 A | 10/1966 | Stroud et al. | |
| 3,283,890 A | 11/1966 | Morris et al. | |
| 3,406,054 A | 10/1968 | Chaffee | |
| 3,427,366 A | 2/1969 | Verdol et al. | |
| 3,445,436 A | 5/1969 | Lake et al. | |
| 3,478,483 A | 11/1969 | Baker | |
| 3,638,465 A | 2/1972 | Lickliter et al. | |
| 3,657,900 A | 4/1972 | Bowser et al. | |

(List continued on next page.)

FOREIGN PATENT DOCUMENTS

| | | |
|---|---|---|
| DE | 2619718 | 11/1977 |
| DE | 29 23 769 | 1/1980 |
| DE | 80 17 644 | 10/1980 |

(List continued on next page.)

OTHER PUBLICATIONS

Advertisement from Lockformer Company (no date).
"IBM Technical Disclosure Bulletin" vol. 11, No. 2, Jul. 19678.

(List continued on next page.)

*Primary Examiner*—I. Cuda-Rosenbaum
*Assistant Examiner*—Essama Omgba
(74) *Attorney, Agent, or Firm*—Donald C. Lepiane

(57) ABSTRACT

A substrate having a bead of a moisture and/or gas pervious adhesive having a desiccant therein is shaped to provide U-shaped spacer stock. The spacer stock is bent to provide a spacer frame having continuous corners.

18 Claims, 3 Drawing Sheets

U.S. PATENT DOCUMENTS

| | | | | | |
|---|---|---|---|---|---|
| 3,674,743 | A | | 7/1972 | Verdol et al. | |
| 3,758,996 | A | * | 9/1973 | Bowser | 55/385.1 |
| 3,768,223 | A | | 10/1973 | Kurz | |
| 3,775,914 | A | | 12/1973 | Patil | |
| 3,867,107 | A | | 2/1975 | Long et al. | |
| 3,877,275 | A | | 4/1975 | Attwood | |
| 3,911,554 | A | | 10/1975 | Ford | |
| 3,919,023 | A | | 11/1975 | Bowser et al. | |
| 3,923,748 | A | | 12/1975 | Hutt et al. | |
| 4,015,394 | A | | 4/1977 | Kessler | |
| 4,057,945 | A | | 11/1977 | Kessler | |
| 4,063,002 | A | | 12/1977 | Wilson, Jr. | |
| 4,069,630 | A | | 1/1978 | Chess et al. | |
| 4,109,431 | A | * | 8/1978 | Mazzoni et al. | 52/172 |
| 4,118,266 | A | * | 10/1978 | Kerr | 156/293 |
| 4,153,594 | A | | 5/1979 | Wilson, Jr. | |
| 4,222,213 | A | | 9/1980 | Kessler | |
| 4,269,255 | A | | 5/1981 | Nailor et al. | |
| 4,270,688 | A | | 6/1981 | Janssens et al. | |
| 4,431,691 | A | | 2/1984 | Greenlee | |
| 4,546,723 | A | | 10/1985 | Leopold et al. | |
| 4,574,553 | A | | 3/1986 | Lisec | |
| 4,590,240 | A | | 5/1986 | Streeter et al. | |
| 4,622,249 | A | * | 11/1986 | Bowser | 428/34 |
| 4,649,685 | A | | 3/1987 | Wolf et al. | |
| 4,780,521 | A | | 10/1988 | Duck et al. | |
| 4,807,419 | A | | 2/1989 | Hodek et al. | |
| 4,807,439 | A | | 2/1989 | Hain et al. | |
| 4,808,452 | A | | 2/1989 | McShane | |
| 4,817,354 | A | | 4/1989 | Bayer | |
| 4,831,799 | A | | 5/1989 | Glover et al. | |
| 4,850,175 | A | | 7/1989 | Berdan | |
| 4,873,803 | A | | 10/1989 | Rundo | |
| 4,933,032 | A | | 6/1990 | Kunert | |
| 4,950,344 | A | | 8/1990 | Glover et al. | 156/109 |
| 4,969,250 | A | | 11/1990 | Hickman et al. | |
| 4,969,346 | A | | 11/1990 | Bosl et al. | |
| 5,177,916 | A | | 1/1993 | Misera et al. | 52/172 |
| 5,246,331 | A | | 9/1993 | Hallahan et al. | |
| 5,255,481 | A | | 10/1993 | Misera et al. | 52/172 |
| 5,295,292 | A | * | 3/1994 | Leopold | 29/417 |
| 5,313,761 | A | * | 5/1994 | Leopold | 52/788 |
| 5,351,451 | A | | 10/1994 | Misera et al. | 52/172 |
| 5,361,476 | A | * | 11/1994 | Leopold | 29/417 |
| 5,377,473 | A | | 1/1995 | Narayan et al. | 52/790 |
| 5,503,884 | A | * | 4/1996 | Meyer et al. | 428/34 |
| 5,509,984 | A | * | 4/1996 | Meyer et al. | 156/107 |
| 5,655,282 | A | * | 8/1997 | Hodek et al. | 29/469.5 |
| 6,112,477 | A | * | 9/2000 | Spinks | 52/172 |
| 6,223,414 | B1 | * | 5/2001 | Hodek et al. | 29/527.1 |
| 6,405,498 | B1 | * | 6/2002 | Riegelman | 52/204.595 |

FOREIGN PATENT DOCUMENTS

| | | | | |
|---|---|---|---|---|
| DE | 30 40 407 | | 5/1981 | |
| DE | 33 02 659 | | 8/1984 | |
| DE | 82 01 396.9 | | 10/1984 | |
| EP | 0 127 739 | | 12/1984 | |
| EP | 0 261 923 | | 3/1988 | |
| EP | 0 403 058 | | 12/1990 | |
| EP | 475213 | * | 3/1992 | E06B/3/66 |
| EP | 0 362 934 | | 12/1992 | |
| GB | 639955 | | 7/1950 | |
| GB | 898981 | | 6/1962 | |
| GB | 1509178 | | 4/1978 | |
| GB | 1585544 | | 3/1981 | |

OTHER PUBLICATIONS

"Super Spacer™", Edgetech I.G. Ltd.

Glover et al.; "Super Spacer™ Technical Report", Edgetech I.G. Ltd., May 1988.

"Introducing Super Spacer™ PIB".

Wright et al., "Thermal Resistance Measurement of Glazing System Edge–Seals and Seal Materials Using a Guarded Heater Plate Apparatus".

* cited by examiner

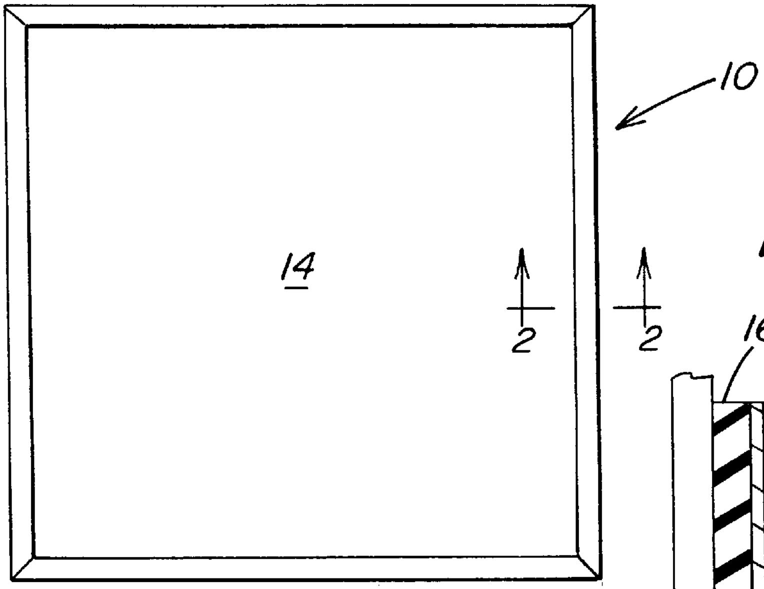
FIG. 1
FIG. 2
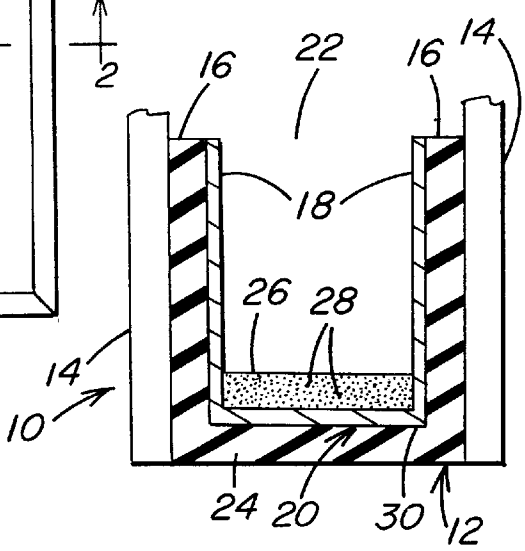
FIG. 3
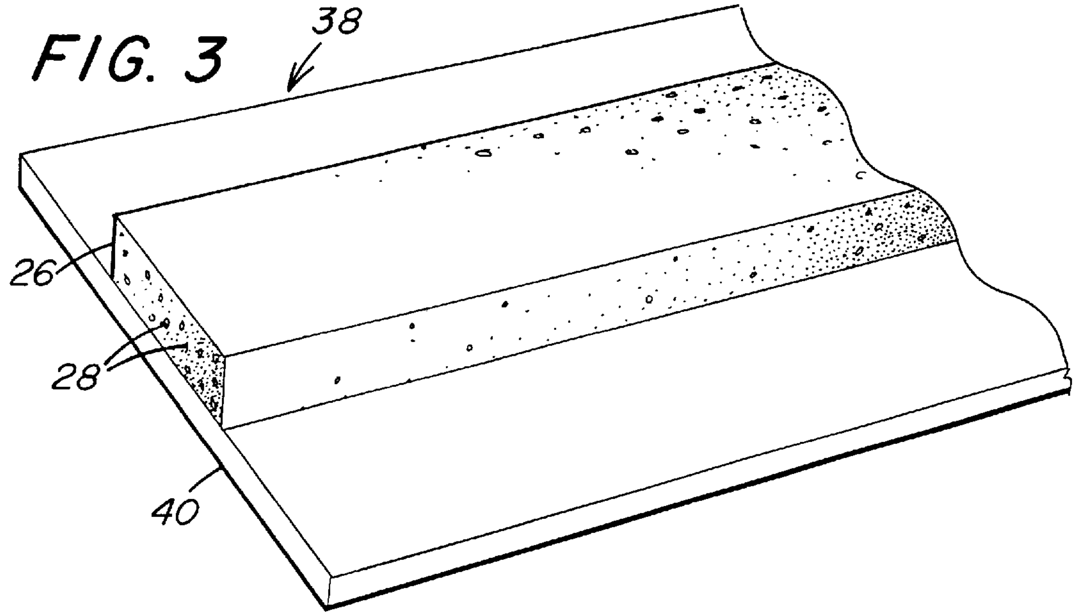

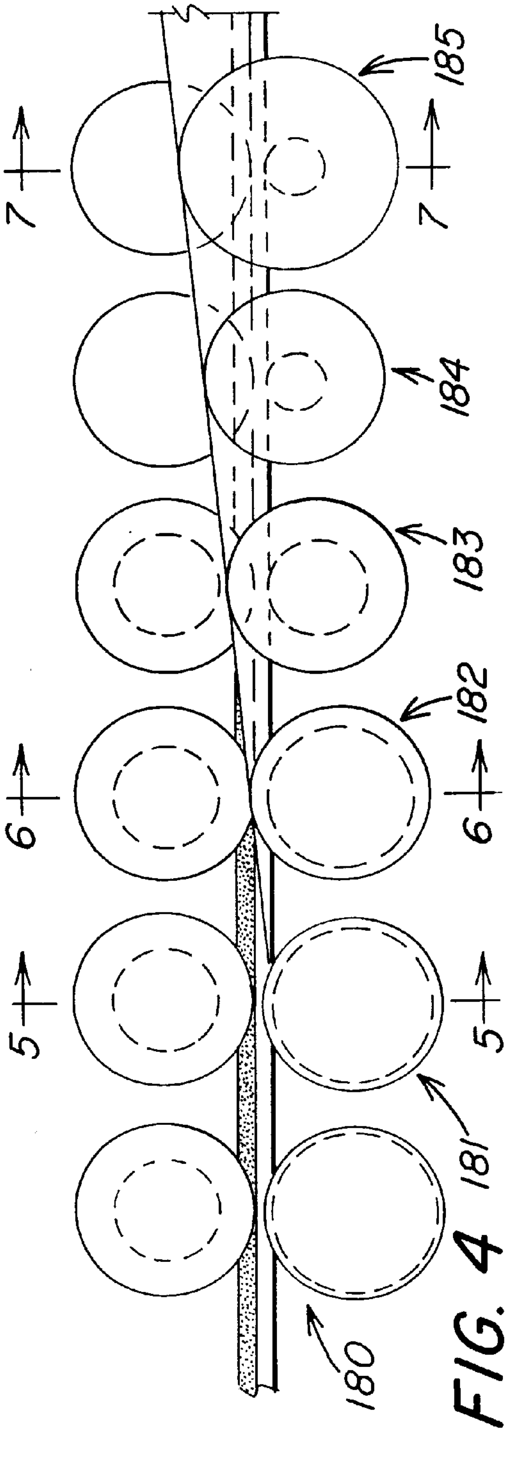
FIG. 4
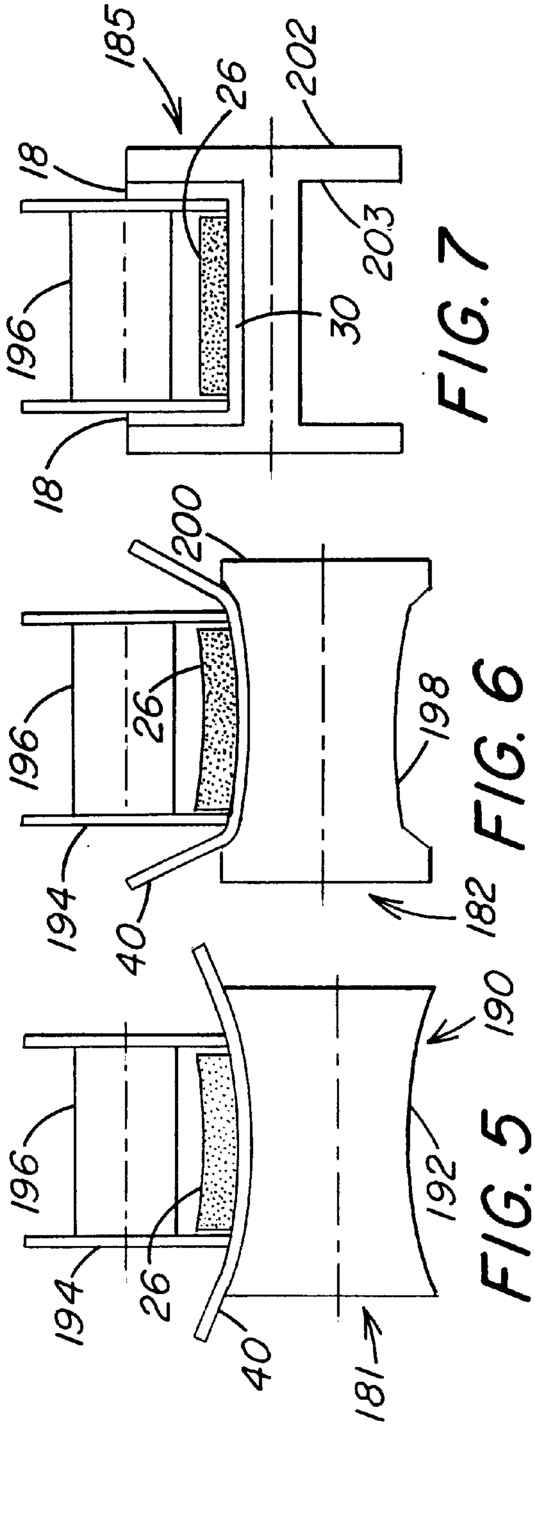
FIG. 7
FIG. 6
FIG. 5

SPACER AND SPACER FRAME FOR AN INSULATING GLAZING UNIT AND METHOD OF MAKING SAME

This is a divisional of U.S. patent application Ser. No. 08/871,826 filed on Jun. 9, 1997, now abandoned, which is a divisional of U.S. patent application Ser. No. 08/451,097 filed on May 25, 1995, now U.S. Pat. No. 5,761,946, which is a divisional of application Ser. No. 08/254,222 filed on Jun. 6, 1994, now U.S. Pat. No. 5,501,013, which is a divisional of application Ser. No. 08/064,264 filed on May 20, 1993, now U.S. Pat. No. 5,351,451, which is a divisional of application Ser. No. 07/906,645 filed on Jun. 30, 1992, now U.S. Pat. No. 5,255,481, which is a divisional of application Ser. No. 07/578,697 filed on Sep. 4, 1990, now U.S. Pat. No. 5,177,916.

RELATED APPLICATION

The spacer and spacer frame taught in this application may be used in the fabrication of the insulating unit taught in U.S. patent application Ser. No. 07/578,696 filed even date in the names of Stephen C. Misera and William R. Siskos and entitled INSULATING GLAZING UNIT HAVING A LOW THERMAL CONDUCTING EDGE AND METHOD OF MAKING SAME.

BACKGROUND OF THE INVENTION

1. Field of the Invention

This invention relates to components for an insulating glazing unit and to methods of making same and, in particular, to a spacer and spacer frame for an insulating glazing unit and methods of making same.

2. Discussion of the Technical Problems

It is well recognized that insulating glazing units reduce heat transfer between the outside and inside of a home or other structures. A measure of insulating value generally used is the "U-value". The U-value is the measure of heat in British Thermal Unit (BTU) passing through the unit per hour (Hr) per square foot (sq.ft.) per degree Fahrenheit (° F.). As can be appreciated the lower the U-value the better the thermal insulating value of the unit, i.e. higher resistance to heat flow resulting in less heat conducted through the unit. Another measure of insulating value is the "R-value" which is the inverse of the U-value. Still another measure is the resistance (RES) to heat flow which is stated in Hr-° F. per BTU per inch of perimeter of the unit. In the past the insulating property, e.g. U-value given for an insulating unit was the U-value measured at the center of the unit. Recently it has been recognized that the U-value of the edge of the unit must be considered separately to determine the overall thermal performance of the unit. For example, units that have a low center U-value and high edge U-value during the winter season exhibit no moisture condensation at the center of the unit, but may have condensation or even a thin line of ice at the edge of the unit near the frame. The condensation or ice at the edge of the unit indicates that there is heat loss through the edge of the unit and/or frame i.e. the edge has a high U-value.

Through the years, the design of and construction materials used to fabricate insulating glazing units, and the frames have improved to provide framed units having low U-values. Several types of insulating glazing units presently available, and or center and edge U-values of selected ones, are taught in U.S. patent application Ser. No. 07/468,039 assigned to PPG Industries, Inc. filed on Jan. 22, 1990, in the names of P. J. Kovacik et al. and entitled METHOD OF AND APPARATUS FOR JOINING EDGES OF GLASS SHEETS, ONE OF WHICH HAS AN ELECTROCONDUCTIVE COATING AND THE ARTICLE MADE THEREBY, and U.S. Pat. Nos. 3,919,023; 4,431,691; 4,807,419; 4,831,799 and 4,873,803. The teachings of the patent application and patents are hereby incorporated by reference.

U.S. patent application Ser. No. 07/578,696 filed even date in the names of Stephen C. Misera and William R. Siskos and entitled INSULATING GLAZING UNIT HAVING A LOW THERMAL CONDUCTING EDGE AND METHOD OF MAKING SAME teaches the design of and methods of making an insulating unit having a low thermal conducting edge. In Section 2 Discussion of Available Insulating Units, the drawbacks and/or limitations of the insulating units of the above identified patent application and patents are discussed. The teachings of U.S. patent application Ser. No. 07/578,696 are hereby incorporated by reference.

As can be appreciated, it would be advantageous to provide a spacer and spacer frame, and method of making same that can be used to fabricate insulating units taught in U.S. patent application Ser. No. 07/578,696 as well as other types of insulating units.

SUMMARY OF THE INVENTION

This invention covers a strip for shaping into spacer stock for use in the fabrication of insulating units. The strip includes a metal substrate having a bead of moisture and/or gas pervious adhesive secured to a surface of the substrate. The metal substrate after forming into the spacer stock e.g. U-shaped spacer stock can withstand higher compressive forces than the bead.

The invention also covers a method of making U-shaped spacer stock for use in fabricating a spacer frame for insulating units. The method includes the steps of passing a metal substrate having a bead of moisture and/or gas pervious adhesive positioned on a surface between spaced pairs of roll forming wheels shaped to gradually bend the metal substrate about the bead into spacer stock having a predetermined cross sectional shape, e.g. U-shaped cross section.

Further, the invention covers a spacer frame for an insulating unit, the spacer frame having a groove to define opposed outer sides and having at least one continuous corner, and methods of making same. A method includes the steps of providing a section of spacer stock sufficient to make a frame of a predetermined size. Opposed surfaces of the spacer stock are biased inwardly while the spacer stock is bent about the depressions of the spacer stock to form a continuous corner. The step to form a continuous corner is repeated until the opposite ends are brought together and sealed e.g. by welding.

BRIEF DESCRIPTION OF THE DRAWINGS

FIG. 1 is a plan view of an insulating unit incorporating features of the invention.

FIG. 2 is a view taken along line 2—2 of FIG. 1.

FIG. 3 is a view of an edge strip incorporating features of the invention having secured thereto a bead of a moisture and/or gas pervious adhesive having a desiccant.

FIG. 4 is a side elevated view of a roll forming station to form the edge strip of FIG. 3 into spacer stock incorporating features of the instant invention.

FIGS. 5 thru 7 are views taken along lines 5 thru 7 respectively of FIG. 4.

DESCRIPTION OF THE INVENTION

Figure 8:
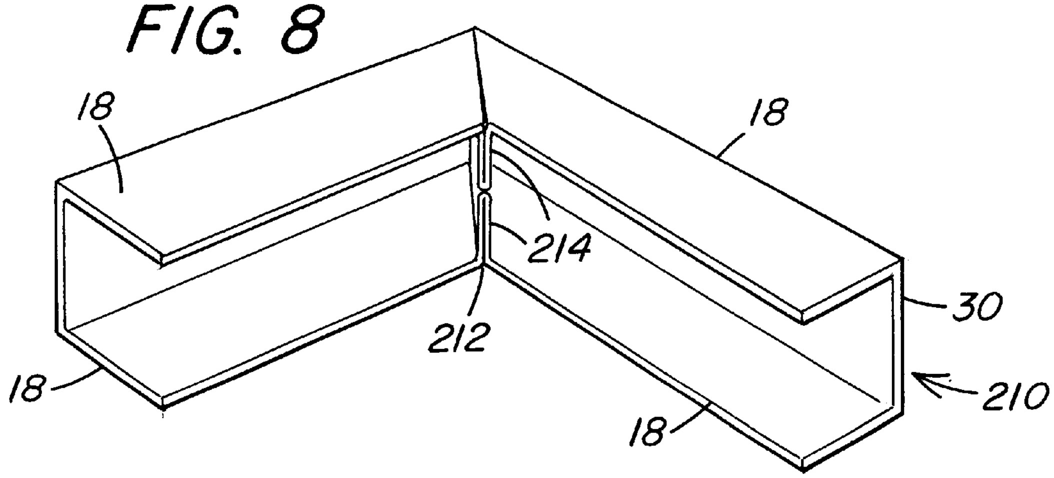
FIG. 8 is a view of a continuous corner of a spacer frame embodying features of the instant invention.

The invention will be discussed in contemplation of fabricating the insulating unit taught in U.S. patent application Ser. No. 07/578,696 filed even date in the names of Stephen C. Misera and William R. Siskos and entitled INSULATING GLAZING UNIT HAVING A LOW THERMAL CONDUCTING EDGE AND METHOD OF MAKING SAME; however, as will be appreciated the instant invention is not limited thereto and may be practiced to fabricate any type of insulating unit using a spacer to maintain sheets in spaced relation. The teachings of U.S. patent application Ser. No. 07/578,696 are hereby incorporated by reference.

In the following discussion like numerals refer to like elements.

With reference to FIGS. 1 and 2 there is shown insulating unit 10 discussed in the above-identified application having edge assembly 12 (shown only in FIG. 2) incorporating features of the invention to space the sheets 14 e.g. coated and/or uncoated glass sheets. The edge assembly 12 includes moisture and gas impervious adhesive type sealant layers 16 adhere to the glass sheets 14 and outer legs 18 of metal spacer 20 to provide compartment 22 between the sheets. The sealant layers 16 act as a barrier to moisture entering the unit and/or a barrier to gas e.g. insulating gas such as Argon from exiting the compartment 22. An additional adhesive sealant type layer or structural adhesive layer 24 may be provided in perimeter groove of the unit formed by the spacer and marginal edges of the sheets 14. As can be appreciated the sealant is not limiting to the invention and may be any types known in the art e.g. of the type taught in U.S. Pat. No. 4,109,431 which teachings are hereby incorporated by reference.

A thin layer or bead 26 of a moisture and/or gas pervious adhesive having a desiccant 28 therein to absorb moisture in the compartment 22 is provided on the inner surface of middle leg 30 of the spacer 20 as viewed in FIG. 2. The adhesive is not limiting to the invention and may be any type that passes moisture and/or gas.

An insulating unit having the edge assembly 12 of the instant invention as shown in FIG. 2 included a pair of glass sheets 14 spaced about 0.47 inch (1.120 centimeters) apart; polyisobutylene layers 16 (moisture and argon impervious) having a thickness of about 0.010 inch (0.254 centimeter) and a height as viewed in FIG. 2 of about 0.25 inch (0.64 centimeter); a 304 stainless steel U-shaped channel 20 having a thickness of about 0.007 inch (0.018 centimeter), the middle or center leg 30 having a width as viewed in FIG. 2 of about 0.45 inch (1.14 centimeters) and outer legs 18 each having a height as viewed in FIG. 2 of about 0.25 inch (0.32 centimeter); a desiccant impregnated polyurethane bead 26 having a height of about 0.125 inch (0.032 centimeter) and a width as viewed in FIG. 2 of about 0.43 inch (1.09 centimeters); a polyisobutylene edge seal 24 having a height of about 0.125 inch (0.32 centimeter) and a width of about 0.47 inch (1.20 centimeters) as viewed in FIG. 2.

With reference to FIG. 3 there is shown an edge strip 38 having a substrate 40 having the bead 26. In the preferred practice of the invention the substrate is made of a material, e.g. metal, that is moisture and gas impervious to maintain the insulating gas in the compartment and prevent the ingress of moisture into the compartment, and has structural integrity to maintain the glass sheets 14 in spaced relation to one another. In the practice of the invention, the substrate was made of 304 stainless steel having a thickness of about 0.007 inch (0.0178 centimeter), a width of about 0.625 inch (1.588 centimeters) and a length sufficient to make a frame for an insulating unit of a predetermined shape and dimension e.g. a 24-inch (0.6 meter) square shaped unit. The bead 26 is any type of adhesive material that is moisture and gas pervious and can be mixed with a desiccant. In this manner the desiccant can be contained in the adhesive material and secured to the substrate while having communication to the compartment. Types of materials that are recommended, but not limiting to the invention include polyurethanes and/or silicones. In an embodiment of the invention a bead about ⅛ inch (0.32 centimeter) high and about 0.43 inch (1.09 centimeters) thick is applied to about the center of the substrate 40 in any convenient manner. In the practice of the invention the metal substrate after forming into spacer stock can withstand higher compressive forces than the bead. As can be appreciated by those skilled in the art, a metal substrate can be fabricated through a series of bends and shaped to withstand various compressive forces. The invention relating to the bead 26 carried on the substrate 40 is defined by shaping the substrate 40 into a single walled U-shaped spacer stock with the resultant U-shaped spacer stock being capable of withstanding values of compressive force greater than the bead secured or to be secured to the U-shaped spacer. In this manner the spacer and not the bead maintains the spacing between the sheets. Substrates and beads having the foregoing relationship are defined for purposes of defining this embodiment of the invention as substrates having more "structural stability" than the bead. As can be appreciated by those skilled in the art the measure and value of compressive forces and structural stability varies depending on the manner the unit is secured in position. For example if the unit is secured in position by clamping the edges of the unit such as in a curtainwall system, the spacer has to have sufficient strength to maintain the glass sheet apart while under compressive forces of the clamping action. When the unit is mounted in a rabbit of a wooden frame and caulking applied to seal the unit in place, the spacer does not have to have as much structural stability to maintain the glass sheets apart as does a spacer of a unit that is clamped in position.

The outer edges of the substrate 40 are bent to form outer legs 18 of the U-shaped spacer 30 shown in FIG. 2 in any convenient manner. For example the substrate 40 having the bead 26 may be shaped by moving it between bottom and top forming rolls shown in FIGS. 4–7.

The substrate 40 having the bead 26 is advanced from left to right as viewed in FIG. 4 between roll forming stations 180 thru 185. As will be appreciated by those skilled in the art, the invention is not limited to the number of roll forming stations or the number of roll forming wheels at the roll forming stations. In FIG. 5 the roll forming station 181 includes a bottom wheel 190 having a peripheral groove 192 and an upper wheel 194 having a peripheral groove 196 sufficient to accommodate the bead 26. The groove 192 is sized to start the bending of the substrate 40 to a U-shaped spacer and is less pronounced than groove 198 of the bottom wheel 200 of the roll forming station 182 shown in FIG. 6 and the remaining bottom wheels of the downstream roll forming station 183 thru 185.

With reference to FIG. 7, the lower roll forming wheel 202 of the pressing station 185 has a peripheral groove 203 that is substantially U-shaped. The spacer stock exiting the roll forming station 185 is the U-shaped spacer 20 shown in FIG. 2.

As can now be appreciated the grooves of the upper wheels may be shaped to shape the bead as the spacer stock is formed.

In the practice of the invention the bead 26 was applied after the spacer stock was formed in a frame. The substrate 40 was pulled through a die of the type known in the art to form a flat strip into a U-shaped strip.

As can be appreciated, the invention is discussed making a U-shaped spacer; however, the invention is not limited thereto and may be used to make spacer stock having any cross sectional shape e.g. the cross sectional shape taught in U.S. Pat. No. 3,105,274 which teachings are hereby incorporated by reference.

An advantage of having the desiccant in the moisture and/or gas pervious bead 26 is ease of handling the desiccant, ease of securing it to the spacer stock and increased shelf life. The shelf life is increased because the desiccant takes a longer period of time to become saturated when in the moisture and/or gas pervious material as compared to being directly exposed to moisture. The length of time depends on the porosity of the moisture and/or gas pervious material.

Figure 10:
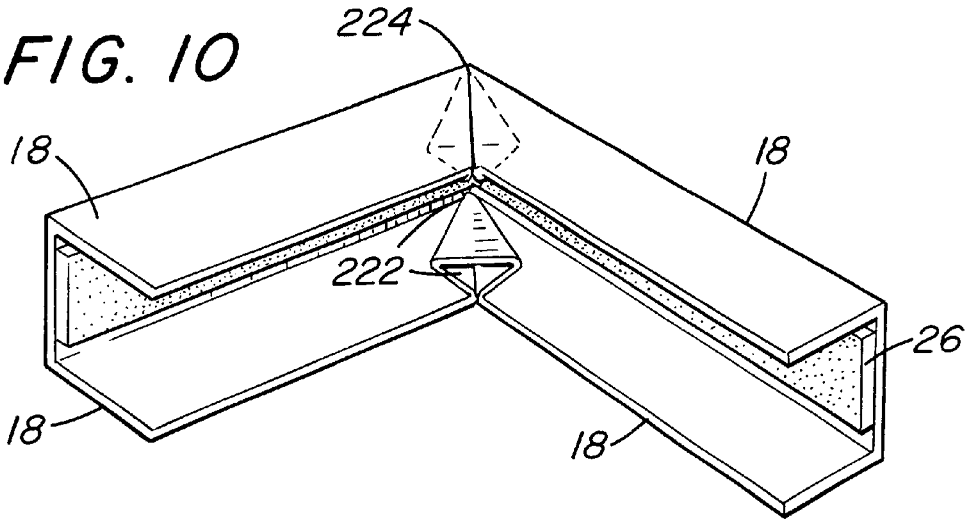
FIG. 10 is a view of another embodiment of a continuous corner of a spacer frame of the instant invention made using the spacer stock shown in FIG. 9.

The spacer stock may be formed into a spacer frame for positioning between sheets. As can be appreciated, the adhesive layers 16 and 24 and the bead 26, shown in FIG. 2 may be applied to the spacer stock or to the spacer frame. The invention is not limited to the materials used for the layers 16 and 24; however, as was discussed, it is recommended that the layers 16 provide high resistance to the flow of insulating gas and/or moisture. The layer 24 may be of the same material as layers 16 or a structural type adhesive e.g. silicone. Before or after the layers 16 and/or 24 are applied to the spacer stock, a piece of the spacer stock is cut and bent to form a spacer frame. Corners may be formed i.e. continuous corners and the free ends of spacer stock welded or sealed use a moisture and/or gas impervious sealant. Continuous corners of spacer frames incorporating features of the invention are shown in FIGS. 8 and 10. As can be appreciated, spacer frames may also be formed by joining sections of U-shaped spacer stock and sealing the edges with a moisture and/or gas impervious sealant or welding the corners together.

With reference to FIG. 8 in the practice of the invention, spacer frame 210 was formed from U-shaped spacer stock. A continuous corner 212 was formed by depressing the outer legs 18 of the spacer stock toward one another while bending portions of the spacer stock about the depression to form a corner e.g. 90° angle. As the portions of the spacer stock are bent the depressed portion 214 of the outer legs 18 move inwardly toward one another. The depressed portions 214 may if desired be offset from one another to accommodate the portions 214 within the outer leg 18. After the frame 210 is formed, layers of sealant 16 are provided on the outer surfaces of the legs 18 of the spacer frame and the bead 26 on the inner surface of the middle leg 30. The unit 10 was constructed by positioning and adhering glass sheets to the spacer frame by the sealant layers 16 in any convenient manner. Thereafter a layer 20 is provided in the peripheral channel of the unit (see FIG. 2) or on the periphery of the unit. Argon gas is moved into the compartment 18 in any convenient manner to provide an insulating unit having a low thermal conducting edge.

Figure 9:
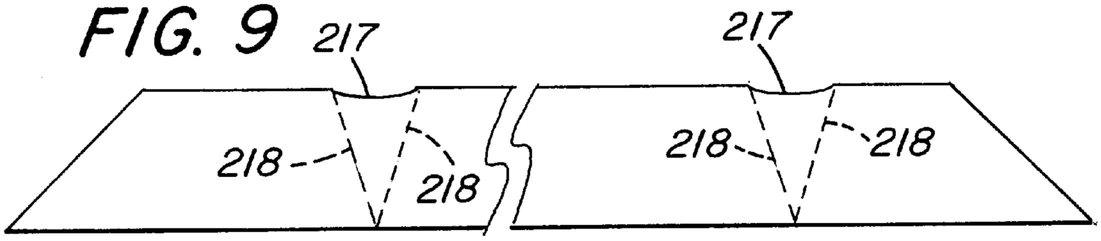
FIG. 9 is a partial side view of a section of spacer stock notched and creased prior to bending to form the continuous corner of the spacer frame shown in FIG. 10 in accordance to the teachings and incorporating features of the invention.

With reference to FIGS. 9 and 10 another technique to form a spacer frame having continuous corners is discussed. A length of the spacer stock having the bead 26 is cut and a notch 217 and creases 218 are provided in the spacer stock at the expected bend lines in any convenient manner. The area between the creases 218 is depressed and portion 222 of the outer legs 18 at the notch are bent inwardly while the portions on each side of bend point are biased toward each other to provide a continuous overlying corner 224 as shown in FIG. 10. The non-continuous corner e.g. the fourth corner of a rectangular frame may be sealed with a moisture and/or gas impervious material or welded. As can be appreciated the bead at the corners may be removed before forming the continuous corners.

As can be appreciated by those skilled in the art, the invention is not limited by the above discussion which was presented for illustrative purposes only and may be used to fabricate any type of insulating unit that has a metal spacer.

What is claimed is:

1. A method of fabricating a spacer frame for maintaining two sheets in spaced relation comprising the steps of:

providing a piece of spacer stock of sufficient length to provide the spacer frame, the spacer stock having at least a pair of side walls joined by a base to provide the sidewalls and base with a U-shape, the spacer stock having a bead of a moisture pervious material having a desiccant therein in contact with surface of the base between the sidewalls defined as inner surface of the base, the bead having structural stability less than the structural stability of the spacer stock;

bending the piece of spacer stock to form the spacer frame, while maintaining the bead on the inner surface of the base during the practice of the bending step.

2. The method as set forth in claim 1 wherein the bead of a moisture pervious material is a bead of moisture pervious adhesive material and the adhesive property of the material maintains the bead on the inner surface of the base during bending of the spacer stock.

3. The method as set forth in claim 2 wherein the providing step is practiced by:

forming a flat substrate into a shape having the pair of sidewalls and the base, while applying the bead of moisture pervious adhesive material on the inner surface of the base to provide the piece of spacer stock.

4. The method of claim 2 wherein the providing step is practiced by:

forming a flat substrate into a shape having the pair of sidewalls and the base, and applying the bead of moisture pervious adhesive material on the inner surface of the base to provide the piece of spacer stock.

5. The method as set forth in claim 2 wherein the providing step is practiced by:

applying a flat substrate having a first end, an opposite end and a center section extending from the first end to the second end;

the bead of moisture pervious adhesive material on selected portions of the center portion of the substrate, and forming the substrate having the bead into the piece of spacer stock.

6. The method of claim 2 wherein the adhesive material is a polyurethane.

7. The method of claim 2 wherein the adhesive material is a silicone.

8. The method of claim 2 wherein the spacer stock has a first end and a second end and the base is continuous from the first end to the second end.

9. The method of claim 1 wherein the sheets are glass sheets.

10. The method of claim 1 wherein the substrate is a metal substrate.

11. A method of fabricating a spacer frame for maintaining two sheets in spaced relation comprising the steps of:

providing a desiccant contained in a pervious adhesive material;

providing a substrate having a first end, a second end, and a center portion extending from the first end to the second end;

forming the substrate and applying a bead of the adhesive containing material to selected portions of the center portion to provide a spacer stock having at least a pair of sidewalls joined by a base to provide the sidewalls and base with a U-shape, and the bead on surface of the base between the sidewalls defined as the inner surface of the base;

bending the piece of spacer stock to form the spacer frame, while maintaining the bead on the inner surface of the base during the practice of the bending step wherein the adhesive property of the adhesive material maintains the bead on the inner surface of the base during the practice of the bending step.

12. The method of claim 11 wherein the step of forming the substrate and applying the bead are practiced simultaneously.

13. The method of claim 11 wherein the applying step is practiced after the forming step.

14. The method of claim 11 wherein the applying step is practiced before the forming step.

15. The method of claim 11 wherein the substrate is a metal substrate.

16. The method of claim 15 wherein the adhesive material is a polyurethane.

17. The method of claim 15 wherein the adhesive is a silicone.

18. The method of claim 11 wherein the upright legs are spaced from one another and only interconnected by the case.

* * * * *